United States Patent
Henke et al.

(10) Patent No.: US 11,653,046 B2
(45) Date of Patent: May 16, 2023

(54) CONTENT TYPE CONCURRENT SESSION LIMITER

(71) Applicant: HULU, LLC, Santa Monica, CA (US)

(72) Inventors: Paul Henke, Los Angeles, CA (US); Isha Shah, Los Angeles, CA (US); Aleksandar Zambelli, Seattle, WA (US)

(73) Assignee: HULU, LLC, Santa Monica, CA (US)

(*) Notice: Subject to any disclaimer, the term of this patent is extended or adjusted under 35 U.S.C. 154(b) by 0 days.

(21) Appl. No.: 17/391,600

(22) Filed: Aug. 2, 2021

(65) Prior Publication Data
US 2023/0032615 A1 Feb. 2, 2023

(51) Int. Cl.
*H04N 21/266* (2011.01)

(52) U.S. Cl.
CPC ............... *H04N 21/26606* (2013.01)

(58) Field of Classification Search
CPC .................................... H04N 21/26606
See application file for complete search history.

(56) References Cited

U.S. PATENT DOCUMENTS

2017/0094334 A1* 3/2017 Le-Chau ............ H04N 21/6143

\* cited by examiner

*Primary Examiner* — Nicholas T Corbo
(74) *Attorney, Agent, or Firm* — Kwan & Olynick LLP

(57) ABSTRACT

In some embodiments, a method receives a request for an instance of content and determines content metadata for the instance of content. A metric for concurrent playback sessions based on the content metadata is determined. The concurrent playback sessions are actively streaming content. The method evaluates the request to block or allow the request based on comparing the metric for concurrent playback sessions to a threshold for the concurrent playback sessions.

20 Claims, 8 Drawing Sheets

```
{                                                502          500
    "globalConcurrentSessionLimit": 10000000,
    "contentCategoryLimits": [
        {       506
            "categoryName": "Live on SVOD",
     510 ─┬─  "globalConcurrentSessionThreshold": 0.86,
          └─  "categoryConcurrentSessionLimit": 1500000,    516
            "contentPackageIds": [ 24 ],        512
            "contentAssetTypes": [ "LIVE" ]            518
        },                                 514
        {
            "categoryName": "Entertainment + Espanol LIVE",
            "globalConcurrentSessionThreshold": 0.88,
            "contentPackageIds": [ 21, 23 ],
            "contentAssetTypes": [ "LIVE" ]
        },
        {
            "categoryName": "Premium LIVE",
            "globalConcurrentSessionThreshold": 0.90,
            "contentPackageIds": [ 15, 17, 18, 19 ],
            "contentAssetTypes": [ "LIVE" ]            520
        },
        {
            "categoryName": "MVPD LIVE",
            "globalConcurrentSessionThreshold": 0.92,
            "contentPackageIds": [ 16 ],
            "contentAssetTypes": [ "LIVE" ]
        },
        {
            "categoryName": "Entertainment + Espanol VOD",
            "globalConcurrentSessionThreshold": 0.94,
            "contentPackageIds": [ 21, 23 ],
            "contentAssetTypes": [ "VOD" ]
        },
        {
            "categoryName": "Premium VOD",
            "globalConcurrentSessionThreshold": 0.96,
            "contentPackageIds": [ 15, 17, 18, 19 ],
            "contentAssetTypes": [ "VOD" ]
        },
        {
            "categoryName": "MVPD VOD",
            "globalConcurrentSessionThreshold": 0.98,
            "contentPackageIds": [ 16 ],
            "contentAssetTypes": [ "VOD" ]
        }
    ]
}
```

FIG. 5

CONTENT TYPE CONCURRENT SESSION LIMITER

BACKGROUND

Computer systems may behave differently and provide different quality of service based on incoming network traffic. When a computer network becomes overloaded with traffic, problems may occur. For example, client devices may experience slower download speeds or worse, failures where the stream is lost.

The computer network may drop traffic when the rate of traffic on the network exceeds a threshold. When the threshold is met, the computer network may indiscriminately drop packets of any type of traffic when the threshold is reached. Indiscriminately dropping packets or requests may adversely affect the user experience because the quality of playback is highly dependent on the client application's ability to successfully and consistently receive responses from backend servers. Also, because the network may be programmed to indiscriminately drop packets or requests, it is also unable to distinguish between type of content or which user account is impacted. A video streaming service provider, however, may consider some content streams more important than others. For example, a live stream of a television news channel may be considered more important than video-on-demand streams. However, the blocking of requests or dropping of packets may indiscriminately affect both live streams and video on demand streams.

BRIEF DESCRIPTION OF THE DRAWINGS

With respect to the discussion to follow and to the drawings, it is stressed that the particulars shown represent examples for purposes of illustrative discussion, and are presented to provide a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 5 depicts an example of a configuration of global session limits according to some embodiments.

DETAILED DESCRIPTION

Described herein are techniques for a networking system. In the following description, for purposes of explanation, numerous examples and specific details are set forth to provide a thorough understanding of some embodiments. Some embodiments as defined by the claims may include some or all the features in these examples alone or in combination with other features described below and may further include modifications and equivalents of the features and concepts described herein.

A system may perform a limiting function, such as limiting a rate of requests to servers, on a network based on concurrency metrics. The concurrency metrics may measure the number of concurrent playback sessions that are currently viewing content. Such concurrency metrics may be different from metrics that measure initial requests for playback of content because client devices can request content initially, but then stop viewing the content shortly thereafter. Accordingly, the concurrency metrics may provide a real-time view of server load as it relates to active client devices that have current active sessions that are viewing content, which may be more accurate than relying on initial requests that were sent previously.

The system may also retrieve concurrency metrics based on contextual data for the content being requested and enforce limits on different types of content. For example, the system may apply thresholds for concurrency metrics to a specific type of content. Then, if a threshold is met indicating the specific type of content should be rate limited, the system can perform a rate limiting action, such as blocking a request for the specific type of content. The rate limiting is thus content-aware, which allows the network to prioritize different types of content. For example, the system may allow content that may be considered higher priority to be streamed while blocking some requests for content that is considered lower priority when concurrent playback sessions on the network has reached a threshold.

System Overview

Figure 1:
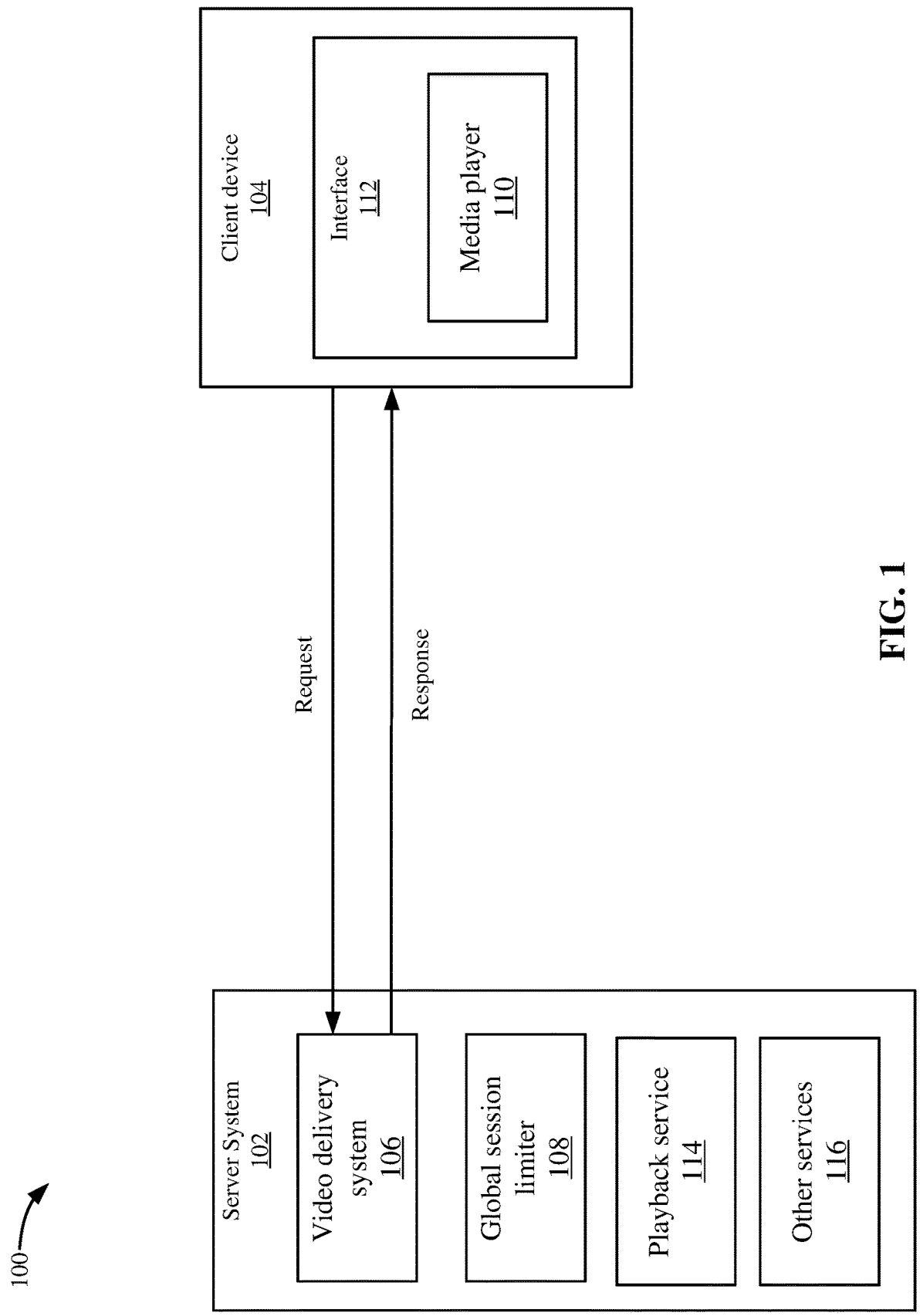
FIG. 1 depicts a simplified system for performing session limiting according to some embodiments.

FIG. 1 depicts a simplified system 100 for performing session limiting according to some embodiments. System 100 includes a server system 102 and client device 104. Although a single instance of server system 102 and client device 104 is shown, multiples instances will be appreciated. For instance, server system 102 may include multiple servers or other computing devices to provide the functionality described herein. Also, system 100 may include multiple client devices 104 that interact with server system 102.

Server system 102 may include a video delivery system 106 that delivers videos to client devices 104. In some embodiments, video delivery system 106 may use a content delivery network (CDN) (not shown) to deliver the videos. The videos may be content that is requested by a user account associated with client device 104. For example, a user account may request a movie, an episode of a show, etc. In some embodiments, video-on-demand and live programming may be types of content that can be requested. Video-on-demand content may be requested on-demand at any time. Live programming may be based on a linear release schedule where a program may be requested during the time that the program is offered. Although videos are described, it will be understood that other content may also be delivered, such as a website, page of content, etc.

Server system 102 may include multiple services, which perform functions that are required to operate video delivery system 106. For example, a playback service 114 may perform services related to playback of content. Other services 116 may include services that may be related to the playback of content, such as processing the exchange of content metadata, processing of DRM (digital rights management) licenses, processing of entitlements (e.g., scheduling/rights) metadata, content metadata, processing of media player heartbeat data, processing of instrumentation event data, etc. Each service may consume computing resources. As will be discussed below, the rate limiting may limit the resources that are being used such that the services can be performed without degradation or failure.

Client device 104 may be a computing device, such as a smartphone, living room device, personal computer, tablet, television, set-top box, etc. Client device 104 may include an interface 112 that may display the content, such as videos. For example, a media player 110 may play back a video that is requested from video delivery system 106. A user account may use client device 104 and may be associated with video delivery system 106 (e.g., the user account signs up for the service). A user that is associated with the user account may use client device 104.

Although multiple client devices 104 are not shown, video delivery system 106 may receive multiple requests from multiple client devices 104. Client devices 104 may send requests for content to video delivery system 106. For example, the requests may be for playback of different content, such as different videos.

Video delivery system 106 may use a global session limiter 108 to determine how to respond to requests. For example, global session limiter 108 may allow a request and video delivery system 106 provides information to client device 104 to stream the requested content. Also, global session limiter 108 may not allow the request and video delivery system 106 responds to client device 104 with an indication that the request is not allowed (e.g., blocked). When a request is blocked, client device 104 cannot stream the video for this request. It is noted that client device 104 may send additional requests for the content, which may be re-evaluated by video delivery system 106.

As will be discussed in more detail below, global session limiter 108 may evaluate the request based on concurrency metrics. The concurrency metrics may be based on a number of concurrent playback sessions that may be actively streaming content. Active playback sessions may be determined in different ways, such as when the session is marked as currently active by a client and has not been timed out. An active playback session may be a session that has been established and is actively streaming content to client device 104. The session may also perform other actions, such as network calls to backend systems in server system 102 so that video playback can be tracked, advertising beacons relating to advertisement display, digital rights management enforcement, etc. The active playback session may be different from a stream of content, which is the stream that is delivering the content, but is separate from the other services that may be performed in the session. Also, the active playback session may have already sent a request for content and had that request allowed. Then, the playback session remains active until the active status is removed, such as when the session is ended (e.g., timed out, the user account logs out, the session ends, etc.) The active playback session then actively streams content to client device 104. The active playback session may request multiple streams while being active, such as client device 104 sends multiple requests for live programming over time if multiple programs are offered. That is, at the top of the hour, the live programming may change from one live program to a next live program. The active playback session may send a request for the next live program. While initial requests may be blocked, global session limiter 108 may also analyze already established playback sessions and apply the limiting to current playback sessions in a similar manner as described. For example, instead of blocking a request, global session limiter 108 may end a currently active session or stop sending packets (e.g., drop) in an active session.

Global session limiter 108 may apply different session limits, which may include a global concurrent session limit and category concurrent session limits. The session limits may be applied to different types of requests. For example, the global concurrent session limit may be applied across all requests for content regardless of content type. The category concurrent session limits may be applied to requests for content in content categories. For example, global session limiter 108 may analyze concurrency metrics for different categories of content. That is, global session limiter 108 may not just measure total requests, but may determine a category of content and measure the concurrency metrics for the category of content. The category of content may be based on contextual data from the request. In some embodiments, the contextual data may depend on the user account that sent the request and/or which content is requested. For example, the contextual data may be information about the content (e.g., content metadata), such as a content type or entitlement information. The content type may classify content with different classifications, such as delivery type (e.g., live programming or video on demand), content characteristics (e.g., genre), etc. The delivery type may describe how the content is delivered where live programming is delivered on a linear schedule and on demand can be requested on demand. Also, the contextual data may be entitlements, which may be permissions to use the types of content. That is, content may be associated with different entitlements, such as paid subscriptions, that define different restrictions on which user accounts can access the content. For example, a paid subscription to a network is a first entitlement that is associated with an entitlement ID of "19" and a paid subscription to another network is a second entitlement with an entitlement ID of "24".

The use of the contextual data may apply session limits that improve the use of the computer network for video delivery system 106. For example, video delivery system 106 may provide a service that may prioritize content types differently. Thus, using the content type to determine session limits allows video delivery system 106 to prioritize content differently. Also, video delivery system 106 may prioritize content with different entitlements that define subscriptions to different content (e.g., networks, sports channels, etc.). Other information may also be used, such as user location, client device type, content popularity, streaming versus downloaded content (for offline viewing), etc.

Global session limiter 108 may determine concurrency metrics based on the contextual data and apply a respective threshold for the contextual data. If the threshold is met (e.g., above), global session limiter 108 may block the request. If the concurrency metrics are not met (e.g., below) the threshold, then global session limiter 108 may allow the request. The request may not be allowed because the concurrency metrics may indicate that server system 102 may be experiencing high load that may affect the quality of service. For example, the above may limit the rate of requests to ensure that server system 102, such as playback service 114 and other services 116, are not overloaded.

Using the concurrency metrics may improve the operation of the computer network. For example, a more accurate view of the use of the computer network is provided using the concurrency metrics. As described above, if the number of requests is just analyzed, the actual server load being presently experienced in the network is not being analyzed. The use of concurrency metrics may be a better representation of server load for playback service 114 and other services 116 than just analyzing the rate of requests. For example, the session may include streaming the video and also any transfer of data that is exchanged while streaming the video. The limiting of concurrent sessions may consider more than just the stream of content by considering the load on server system 102 and the various services provided by server system 102. For example, services offered by server system 102 have been load tested to handle 10 million concurrent playback sessions. If global session limiter 108 allows the number of concurrent viewers to exceed 10 million, certain playback services may start failing or performing poorly due to overload, which in turn could cause playback sessions already in progress to degrade in the quality of experience or fail entirely. If that were to happen it would occur indiscriminately across playback sessions, and server system 102 may have no control over the scope or nature of the impact on existing playback experiences. If, on the other hand, global session limiter 108 is configured to block new playback requests any time more than 10 million concurrent playback sessions are already in progress—that would allow global session limiter 108 to protect and preserve the high quality of playback experience for existing sessions while selectively blocking requests to allow for more control.

Also, using a computer network that provides both live programming and video on demand may operate differently than a general computer network that transfers data of the same type. For example, at the top of the hour, when live programming starts a new show, there may be a large increase in the rate of requests for the new show. However, the concurrency metrics may be largely unchanged because client devices 104 that are already downloading video in a session on a stream are just requesting a new show that is available at the top of the hour. If a rate limiter that considered only requests is used, some of the requests for the new show may be rejected even though the request is from an active session. However, the number of concurrent playback sessions may remain stable, and server system 102 (e.g., playback service 114 and other services 116) may be able to handle the amount of requests without any adverse effects. In some embodiments, video delivery system 106 may use a separate content delivery network (not shown) to deliver the requested content. Global session limiter 108 may be concerned with load on playback service 114 and other services 116, which may be different than traffic on content delivery networks. The thresholds may be set such that load on server system 102 and playback service 114 and other services 116 is limited. Accordingly, global session limiter 108 may not reject requests and the operation of server system 102 (and a computer network) is improved.

The use of the contextual data may also allow global session limiter 108 to prioritize different content types. The category concurrent session limits may apply limiting in a content aware manner that may allow higher priority content to be unaffected by the rate limiting, but lower priority content may be limited. For example, a video-on-demand video may always be available for a client device 104 to watch. However, live programming may not be available after the scheduled time. Accordingly, if the live programming is prioritized, client devices 104 will be able to stream the live programming, but if requests for the live programming are blocked, then client devices 104 may not be able to view the live content at a given point in time. However, if a video-on-demand content request is blocked, client device 104 can re-request the video-on-demand content at a later time because it is still available.

Server System

Figure 2:
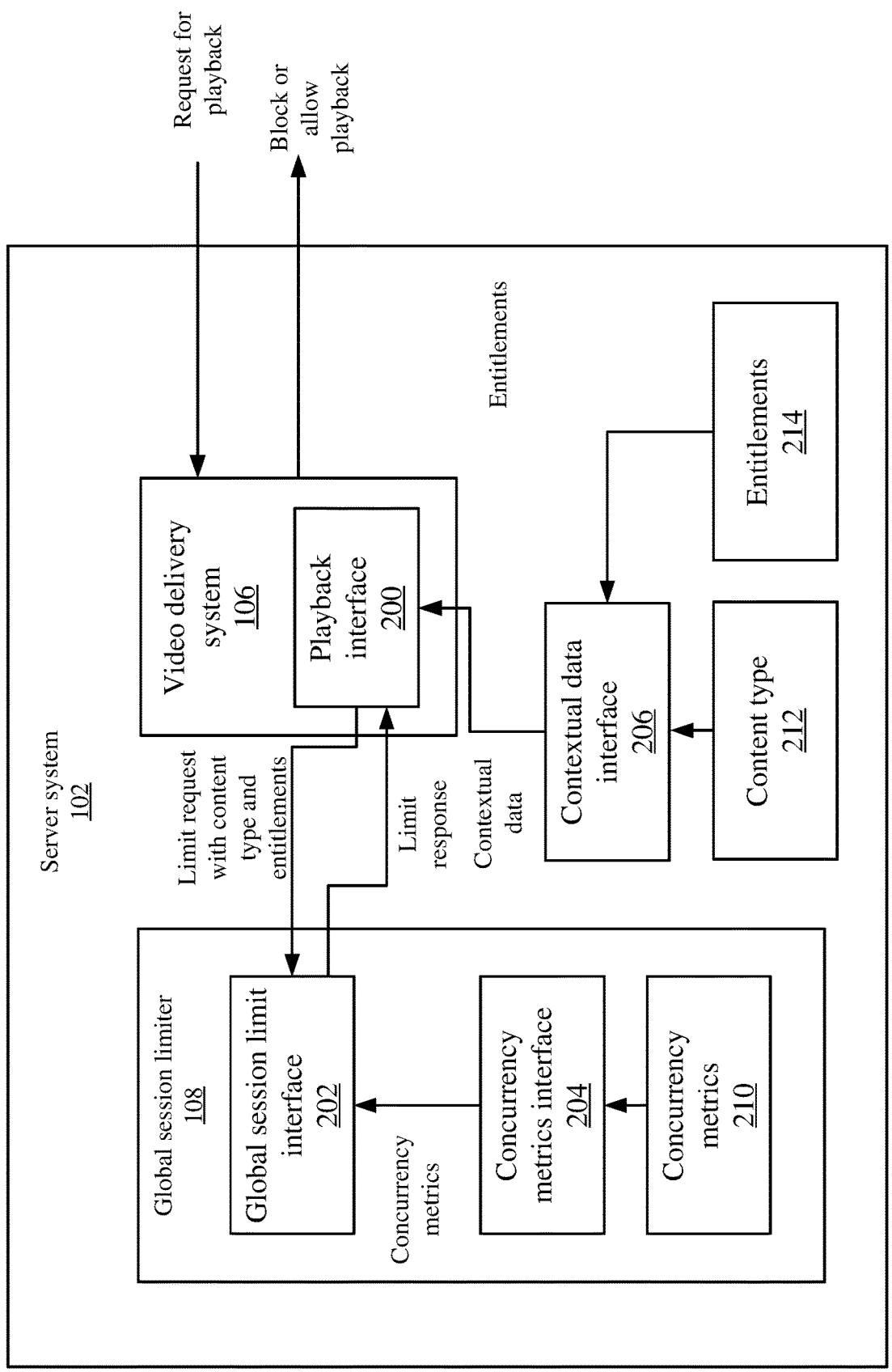
FIG. 2 depicts a more detailed example of a server system according to some embodiments.

FIG. 2 depicts a more detailed example of server system 102 according to some embodiments. Video delivery system 106 includes a playback interface 200 that receives a request for playback of content from client device 104. Playback interface 200 may evaluate the request and provide a response to client device 104. For example, playback interface 200 may communicate with multiple interfaces for services that are needed to evaluate the request. Although different interfaces are described, playback interface 200 may retrieve information in different ways. Retrieving the information may include determining the information using different methods, such as looking up the information, communicating with another entity, receiving the information, etc.

A contextual data interface 206 is an interface to retrieve contextual data. For example, Contextual data interface 206 may retrieve information describing different instances of content in storage 212. For example, the contextual data may include information about the type of content that is being requested for playback as described above. The content type may store an identifier or flag that indicates whether the instance of content is a live content type "LIVE" or video on demand content type "VOD".

Contextual data interface 206 may also retrieve entitlements from storage 214. For example, entitlements may define restrictions on which user accounts can access the content. Each instance of content may have one or more entitlements stored that define which user accounts can access the content. A package identifier (ID) may be used to define the entitlements associated with content. For example, a package identifier may represent a combination of three different entitlements of a location, a device type, and a paid subscription, but other combinations may be appreciated.

The content type may be used because the type of content can be used to limit requests for certain types of content. The entitlements may be used to prioritize certain content over other content. The entitlements may be subscription based, such as sports packages, network packages. The entitlements may be used to categorize content. Other ways of classifying content may also be used.

Global session limiter 108 includes a global session limit interface 202 that may perform the analysis of whether to block a request or allow a request using the content type and entitlements. Global session limit interface 202 may retrieve applicable concurrency metrics based upon the contextual data, such as the content type and entitlements. A concurrency metrics interface 204 may retrieve concurrency metrics in storage 210 based on parameters provided for the contextual data, such as by content type and entitlements. The concurrency metrics may also include the applicable thresholds that should be applied to the concurrency metrics.

Client Request Processing

Figure 3:
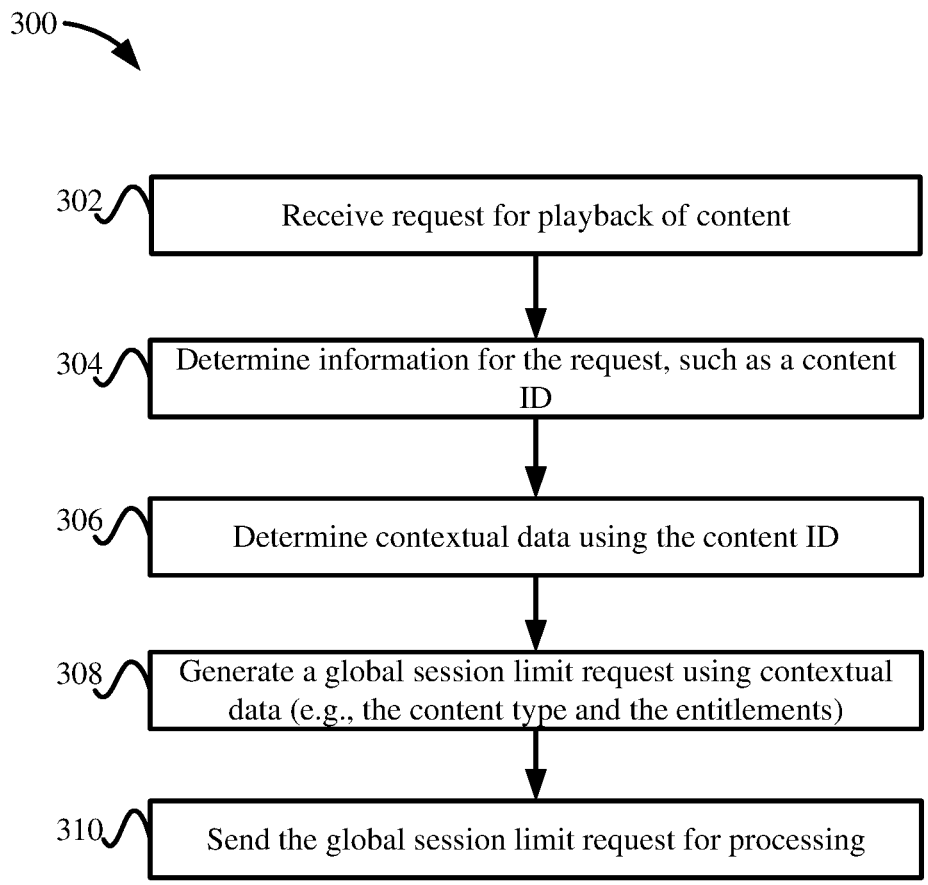
FIG. 3 depicts a simplified flowchart of a method for processing a request at a playback interface according to some embodiments.

FIG. 3 depicts a simplified flowchart 300 of a method for processing a request at playback interface 200 according to some embodiments. At 302, playback interface 200 receives a request for playback of content. For example, a user account may select an instance of content for playback on interface 112. Interface 112 may then send a request for the instance of content, such as a request for playback of a video.

At 304, playback interface 200 determines information for the request, such as a content identifier for the request. For example, the content identifier identifies the instance of content that is being requested. Client device 104 may include the information in the request and/or playback interface 200 may retrieve the information.

At 306, playback interface 200 determines contextual data using the content identifier. For example, playback interface 200 retrieves contextual data, such as a content type and entitlements via contextual data interface 206. Playback interface 200 may send a query using the content identifier to contextual data interface 206. Contextual data interface 206 may look up the content type for the content identifier and may look up the entitlements for the content identifier. In some cases, the content identifier may map to a video on demand content type or a live television content type. Also, the content identifier may map to a package identifier that helps to tie different content packages together as entitlements. For example, for LIVE content type, a package identifier can bundle together only SPORTS channels while excluding non-sports channels.

At 308, playback interface 200 generates a global session limit request using the contextual data, such as the content type and the entitlements. Different requests may have different contexts, such as the content type and entitlements may be different based on the content that is requested.

At 312, playback interface 200 sends the global session limit request to global session limit interface 202 for processing.

Global Session Limit Processing

Figure 4:
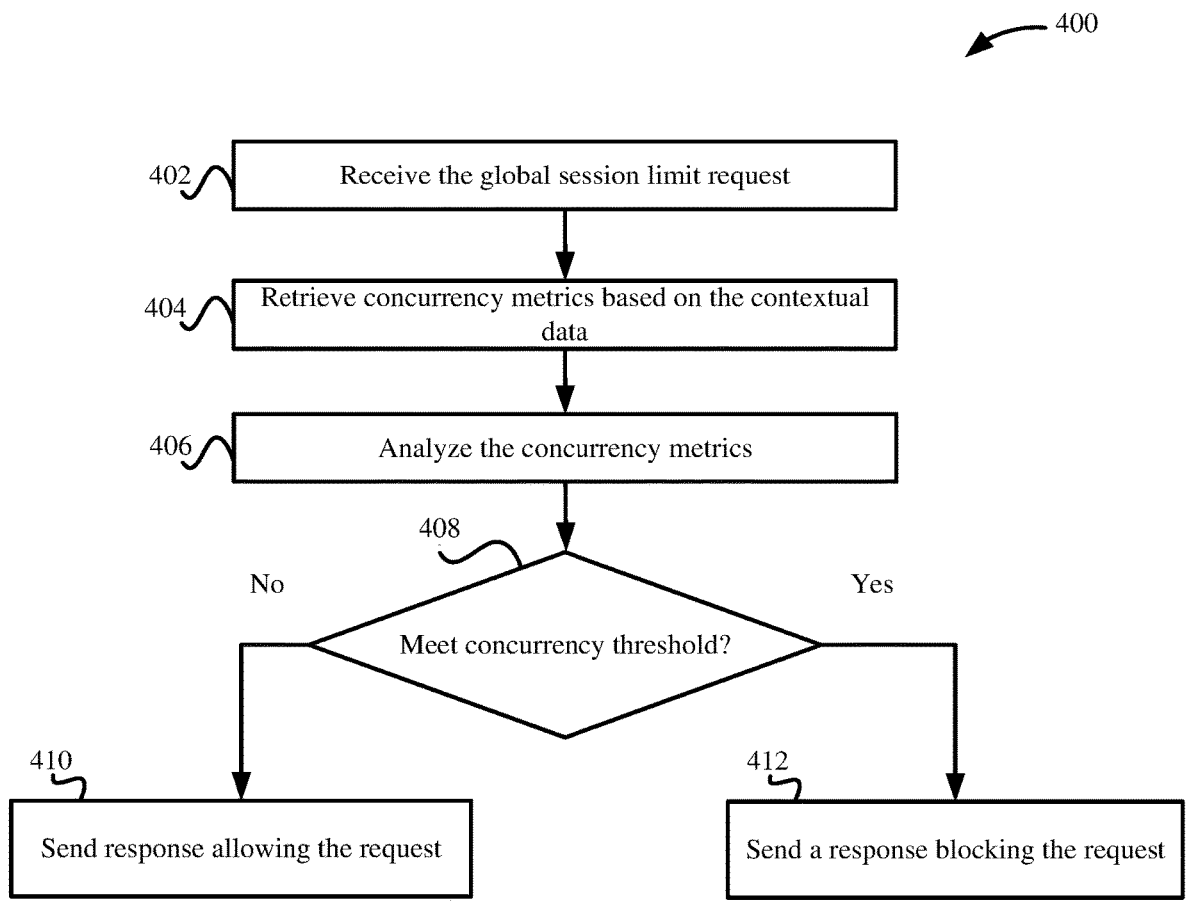
FIG. 4 depicts a simplified flowchart of a method for processing a global session limit request according to some embodiments.

The processing at global session limit interface 202 will now be described. FIG. 4 depicts a simplified flowchart 400 of a method for processing the global session limit request according to some embodiments. At 402, global session limit interface 202 receives the global session limit request from playback interface 200. The request may include the contextual data or global session limit interface 202 retrieves the contextual data. At 404, global session limit interface 202 retrieves concurrency metrics based on the contextual data, such as the content type and the entitlements. The concurrency metrics may be based on total playback sessions in video delivery system 106. Also, the concurrency metrics may be indexed based on contextual data, such as in different categories. In some embodiments, the categories may include a content type and an entitlement. One example of a content type is a show of "LIVE" programming and a package ID of "17". In some embodiments, the current playback sessions that are currently active are identified with the content type and the package ID. Global session limit interface 202 retrieves concurrency metrics for current playback sessions with the identifiers of "LIVE" and "17". The package ID of "17" may represent a restriction on the content, such as the content is available to paid subscribers of a service.

At 406, global session limit interface 202 analyzes the concurrency metrics to evaluate the global session limit request. For example, global session limit interface 202 may retrieve a concurrency threshold. Then, global session limit interface 202 determines if the concurrency metrics meet the concurrency threshold. For example, the concurrency metrics may meet the threshold by being above the threshold depending on the configuration. For example, if the threshold is violated when the number of playback sessions goes above the threshold, then meeting the threshold is when the concurrency metrics are above the threshold.

At 410, global session limit interface 202 sends a response allowing the request if the concurrency threshold is not met. However, at 412, if the concurrency threshold is met, global session limit interface 202 sends a response blocking the request. The blocking of the requests may limit the rate of requests when multiple requests are evaluated over time.

Session Limit Configuration

The global session limits may be configurable to provide content aware limiting of requests. Global session limit interface 202 may receive a configuration for the global session limits. FIG. 5 depicts an example of a configuration 500 of global session limits according to some embodiments. The concurrency limit may be defined in different ways. For example, configuration 500 may specify different granularities of limits that can be applied. In some examples, an absolute global limit may be a value that represents the absolute maximum number of concurrent playback sessions allowed to be active concurrently for video delivery system 106. The absolute maximum limit may be associated with a threshold that, when met, global session limit interface 202 denies playback requests regardless of any contextual data associated with the requests.

The concurrency limits may also be defined per content category. A content category may be defined based on contextual data, such as a combination of entitlements and content types. In some embodiments, when a content category defines multiple entitlements and/or multiple content types, global session limit interface 202 may determine whether or not the request matches the category in different ways. For example, a request may match the content category when any of the entitlements and any of the content types of the request match any of the content types defined in the content category. In other embodiments, all of the content package identifiers and content types defined in the content category must be matched. Also, in some embodiments, at least one of the package identifiers and at least one of the content types must match the contextual data for the request. Different ways of matching a category will be appreciated.

At 502, the absolute global limit may list a number of concurrent playback sessions as a threshold, such as "10,000,000" concurrent playback sessions. That is, there may be 10,000,000 concurrent playback sessions allowed in total in video delivery system 106 until some requests may be blocked.

Configuration 500 may generate categories at 504 for content category limits using more granular information that can identify a subset of concurrent playback sessions. For example, configuration 500 may use different combinations of content type and entitlements.

At 506, a category name of "Live on SVOD" is configured, which may be live programming on subscription video-on-demand. Different information may be configured for the category. For example, at 512, the entitlement is defined for this content category. In this case, the entitlement ("contentPackageIds") is a package ID of the number "24". Other entitlements may have other numerical values for other packages. Also, the content type is defined at 514 as "contentAssetTypes" with a value of "LIVE", which stands for live programming. Another content type may be "VOD" for video on demand.

At 510, thresholds for this category may be configured. Different types of content category-based session limits may be defined. For example, a global concurrent session threshold may be a ratio of the global concurrent session count versus the absolute global limit. The global concurrent session count is the total number of concurrent playback sessions, not just sessions for the category. This may set a lower absolute global limit when the request is associated with this category. For example, for certain traffic, video delivery system 106 may not want the number of concurrent sessions to reach the absolute global limit before blocking requests. For instance, video delivery system 106 may proactively block requests to ensure that services are not degraded when dealing with a request of this category. The absolute global limit is defined at 502 as "10,000,000", and the global concurrent session threshold for the category is 0.86 of the absolute global limit (0.86*10,000,000=8,600,000). When the ratio (global concurrent session count/absolute global limit) meets the threshold (e.g., exceeds), global session limit interface 202 may deny a new request. For example, if the global concurrent session count is 9,000,000, the ratio is 9,000,000/10,000,000 or 0.90 is greater than 0.86, and the request is blocked.

Another threshold may be a category concurrent session limit (categoryConcurrentSessionLimit), which is a limit per content category. The category concurrent session limit may represent the maximum concurrent playback sessions allowed per content category. For example, at 518, if the category concurrent session limit is 15,000,000 for the content type of LIVE with an entitlement of 24, when the number of concurrent playback sessions actively streaming content of the content-type LIVE with an entitlement ID of 24 reaches 15,000,000, any new requests for the content-type LIVE and entitlement of 24 will be blocked.

It is noted that some categories may not have both types of thresholds. For example, at 520, only one threshold for the global concurrent session threshold is defined for the category of "Premium LIVE". Also, the entitlements and content types may have different numbers of values, such as the category "premium VOD" at 516 includes four entitlements of "15, 17, 18, and 19".

Configuration 500 may include other categories that may define different combinations of thresholds, entitlements, and content types. It is noted that the categories may not include both entitlements and content types. Also, the categories may include information other than entitlements and content types.

Figure 6:
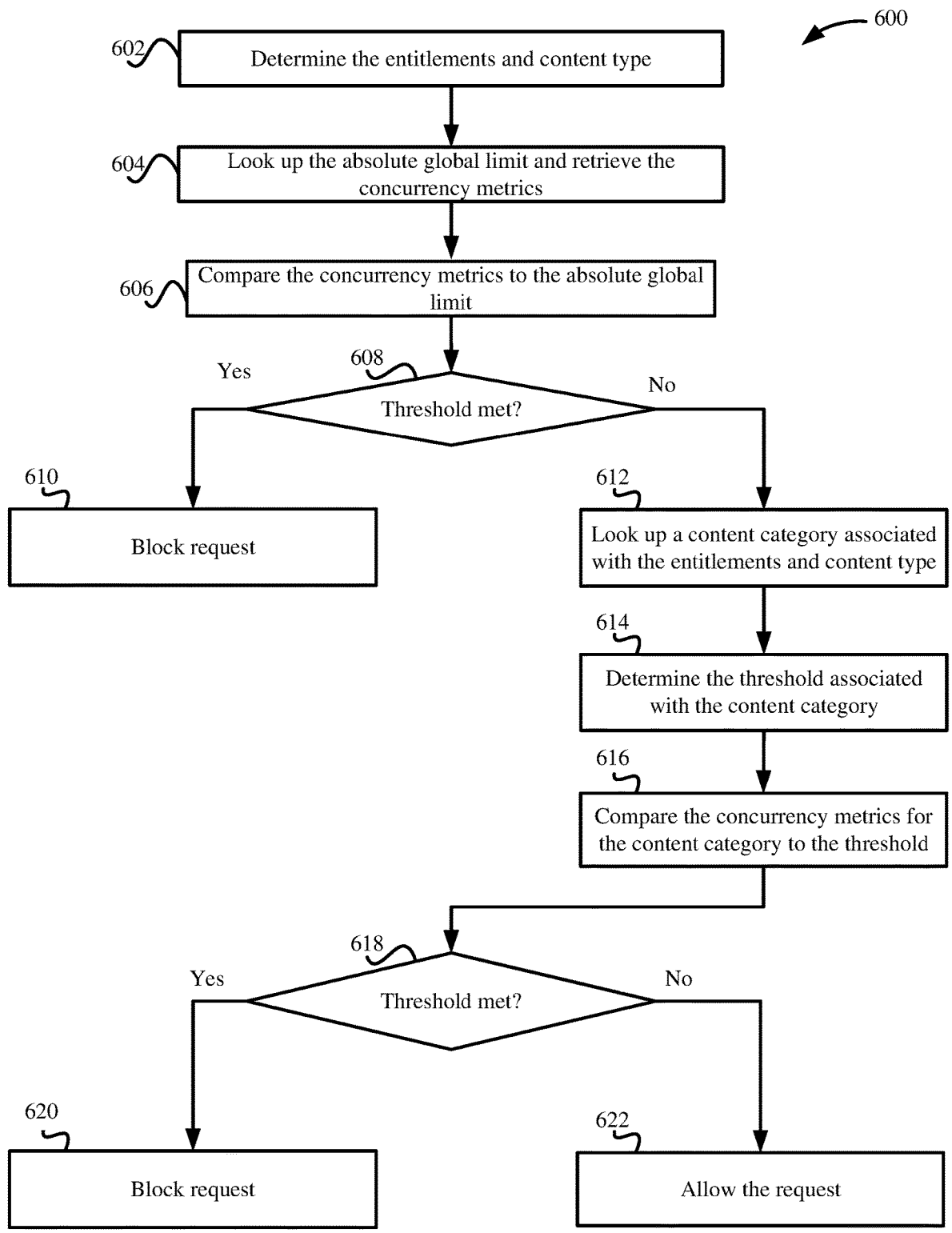
FIG. 6 depicts an example of processing a request using the thresholds in a configuration according to some embodiments.

FIG. 6 depicts an example of processing a request using the thresholds in configuration 500 according to some embodiments. At 602, global session limit interface 202 determines entitlements and a content type for the request. In some embodiments, the entitlements may include one or more entitlements and the content type may be either a LIVE or VOD. This may form a combination of content type and entitlements.

At 604, global session limit interface 202 looks up the absolute global limit and retrieves concurrency metrics for the absolute global limits. Then, at 606, global session limit interface 202 compares the concurrency metrics to the absolute global limit. At 608, global session limit interface 202 determines if the absolute global limit is met. If the absolute global threshold is met, then at 610, global session limit interface 202 blocks the request. This means that total concurrent playback sessions in video delivery system 106 are above the absolute global limit and the request is blocked. No other analysis may need to be performed.

If the absolute global limit is not met, content categories may be tested. At 612, global session limit interface 202 looks up a content category associated with the entitlements and the content type. In some embodiments, the content category may match the entitlements and content type when it includes any of the entitlements and content type. In some embodiments, only a single category is matched. In other embodiments, multiple categories may be matched. When multiple categories are matched, global session limit interface 202 may perform different actions to determine the priority of the categories. For example, global session limit interface 202 may select one category, such as a highest ranked category if the categories are ranked, and use the respective thresholds for that category. In other embodiments, global session limit interface 202 may select a threshold from all the thresholds for each content category. For example, global session limit interface 202 may use a threshold that is the lowest value. Also, all the thresholds may all the categories may be tested. Other types of thresholds may also be used, such as thresholds that supersede all others in priority when set.

At 614, global session limit interface 202 determines a threshold associated with a content category. In this case, only one threshold and one content category will be discussed, but multiple thresholds or categories may be determined. Then, at 616, global session limit interface 202 compares the concurrency metrics for the content category to the respective threshold. At 618, global session limit interface 202 determines whether the threshold is met. The threshold may be based on a percentage of an absolute global limit or a category concurrent session limit. If the content category threshold is met, then at 620, global session limit interface 202 blocks the request. If the content category threshold is not met, at 622, global session limit interface 202 allows the request.

Conclusion

Accordingly, global session limiter 108 may apply limits on sessions based on contextual data that allows requests for content to be limited in a content-aware process. This provides more fine-grained limiting of requests that can improve the operation of server system 102. For example, the concurrency metrics that are used may better represent the real-time status of the load on services provided by server system 102 and the rate limiting of the requests may be more accurately implemented. Also, the limiting may target specific types of requests and allow server system 102 to prioritize different requests associated with different content over other requests.

System

Figure 7:
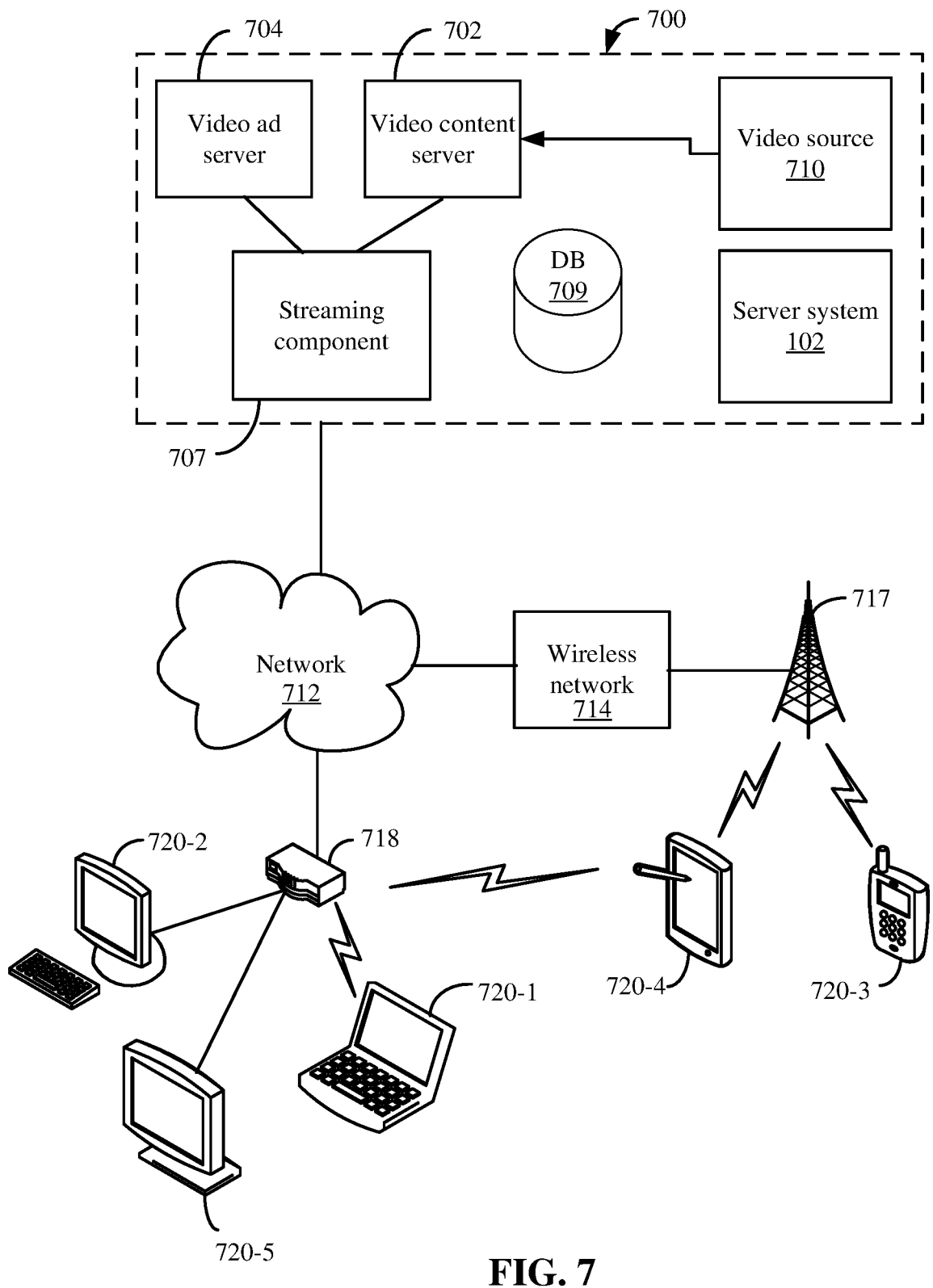
FIG. 7 depicts a video streaming system in communication with multiple client devices via one or more communication networks according to one embodiment.

Features and aspects as disclosed herein may be implemented in conjunction with a video streaming system 700 in communication with multiple client devices via one or more communication networks as shown in FIG. 7. Aspects of the video streaming system 700 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 700, video data may be obtained from one or more sources for example, from a video source 710, for use as input to a video content server 702. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 700 may include one or more computer servers or modules 702, 704, and/or 707 distributed over one or more computers. Each server 702, 704, 707 may include, or may be operatively coupled to, one or more data stores 709, for example databases, indexes, files, or other data structures. A video content server 702 may access a data store (not shown) of various video segments. The video content server 702 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 704 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 700, a public service message, or some other information. The video advertising server 704 may serve the video advertising segments as directed by a user interface controller (not shown).

The video streaming system 700 also may include server system 102.

The video streaming system 700 may further include an integration and streaming component 707 that integrates video content and video advertising into a streaming video segment. For example, streaming component 707 may be a content server or streaming media server. A controller (not shown) may determine the selection or configuration of advertising in the streaming video based on any suitable algorithm or process. The video streaming system 700 may include other modules or units not depicted in FIG. 7, for example, administrative servers, commerce servers, network infrastructure, advertising selection engines, and so forth.

The video streaming system 700 may connect to a data communication network 712. A data communication network 712 may comprise a local area network (LAN), a wide area network (WAN), for example, the Internet, a telephone network, a wireless cellular telecommunications network (WCS) 714, or some combination of these or similar networks.

One or more client devices 720 may be in communication with the video streaming system 700, via the data communication network 712, wireless cellular telecommunications network 714, and/or another network. Such client devices may include, for example, one or more laptop computers 720-1, desktop computers 720-2, "smart" mobile phones 720-3, tablet devices 720-4, network-enabled televisions 720-5, or combinations thereof, via a router 718 for a LAN, via a base station 717 for a wireless cellular telecommunications network 714, or via some other connection. In operation, such client devices 720 may send and receive data or instructions to the system 700, in response to user input received from user input devices or other input. In response, the system 700 may serve video segments and metadata from the data store 709 responsive to selection of media programs to the client devices 720. Client devices 720 may output the video content from the streaming video segment in a media player using a display screen, projector, or other video output device, and receive user input for interacting with the video content.

Distribution of audio-video data may be implemented from streaming component 707 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 707 may communicate with client device 720 using control messages and data messages to adjust to changing network conditions as the video is played. These control messages can include commands for enabling control functions such as fast forward, fast reverse, pausing, or seeking to a particular part of the file at the client.

Since streaming component 707 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 707 may use TCP-based protocols, such as HyperText Transfer Protocol (HTTP) and Real Time Messaging Protocol (RTMP). Streaming component 707 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 8:
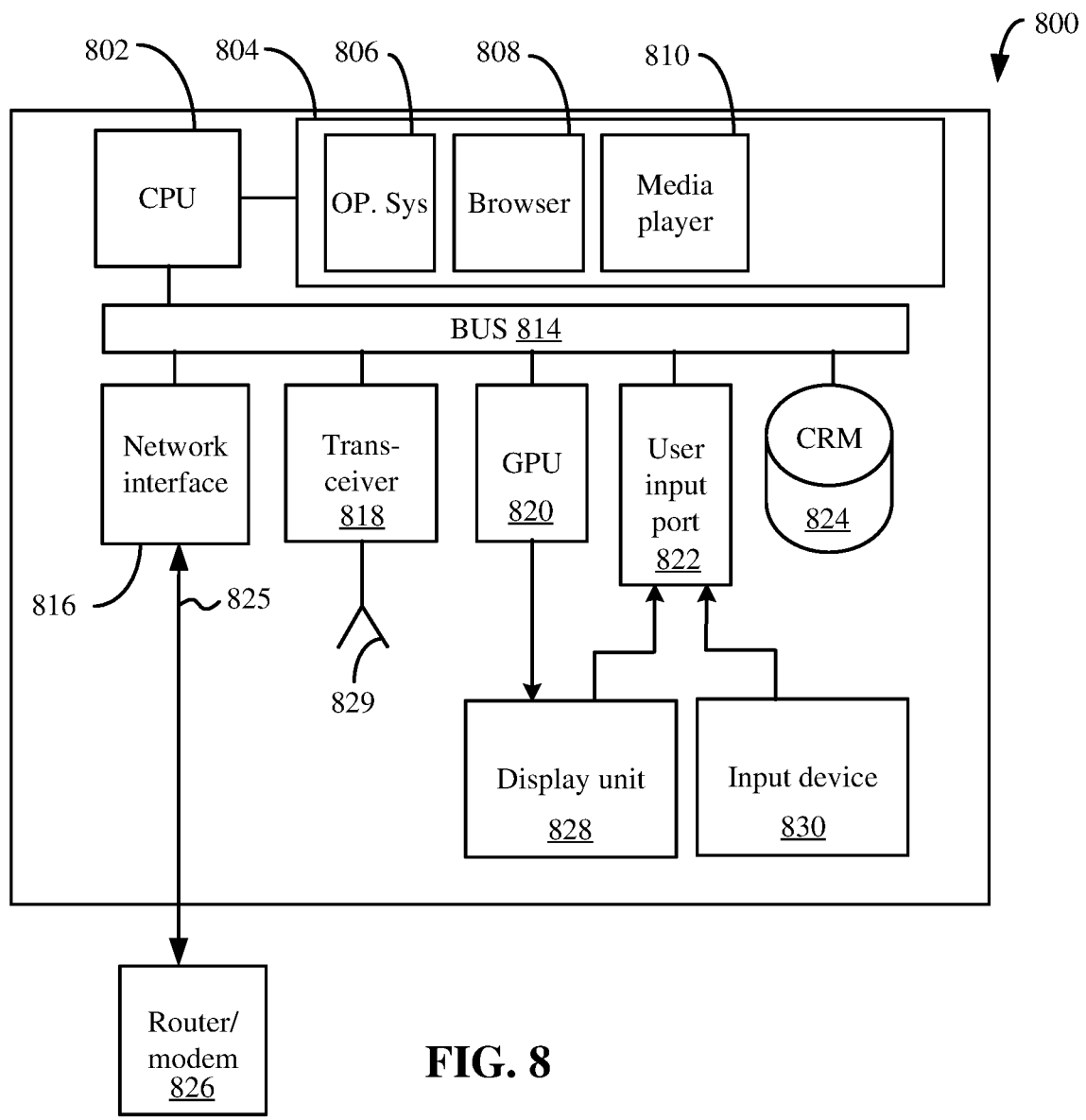
FIG. 8 depicts a diagrammatic view of an apparatus for viewing video content and advertisements.

Referring to FIG. 8, a diagrammatic view of an apparatus 800 for viewing video content and advertisements is illustrated. In selected embodiments, the apparatus 800 may include a processor (CPU) 802 operatively coupled to a processor memory 804, which holds binary-coded functional modules for execution by the processor 802. Such functional modules may include an operating system 806 for handling system functions such as input/output and memory access, a browser 808 to display web pages, and media player 810 for playing video. The memory 804 may hold additional modules not shown in FIG. 8, for example modules for performing other operations described elsewhere herein.

A bus 814 or other communication component may support communication of information within the apparatus 800. The processor 802 may be a specialized or dedicated microprocessor configured or operable to perform particular tasks in accordance with the features and aspects disclosed herein by executing machine-readable software code defining the particular tasks. Processor memory 804 (e.g., random access memory (RAM) or other dynamic storage device) may be connected to the bus 814 or directly to the processor 802, and store information and instructions to be executed by a processor 802. The memory 804 may also store temporary variables or other intermediate information during execution of such instructions.

A computer-readable medium in a storage device 824 may be connected to the bus 814 and store static information and instructions for the processor 802; for example, the storage device (CRM) 824 may store the modules 806, 808, 810 and 812 when the apparatus 800 is powered off, from which the modules may be loaded into the processor memory 804 when the apparatus 800 is powered up. The storage device 824 may include a non-transitory computer-readable storage medium holding information, instructions, or some combination thereof, for example instructions that when executed by the processor 802, cause the apparatus 800 to be configured or operable to perform one or more operations of a method as described herein.

A communication interface 816 may also be connected to the bus 814. The communication interface 816 may provide or support two-way data communication between the apparatus 800 and one or more external devices, e.g., the streaming system 700, optionally via a router/modem 826 and a wired or wireless connection. In the alternative, or in addition, the apparatus 800 may include a transceiver 818 connected to an antenna 829, through which the apparatus 800 may communicate wirelessly with a base station for a wireless communication system or with the router/modem 826. In the alternative, the apparatus 800 may communicate with a video streaming system 700 via a local area network, virtual private network, or other network. In another alternative, the apparatus 800 may be incorporated as a module or component of the system 700 and communicate with other components via the bus 814 or by some other modality.

The apparatus 800 may be connected (e.g., via the bus 814 and graphics processing unit 820) to a display unit 828. A display 828 may include any suitable configuration for displaying information to an operator of the apparatus 800. For example, a display 828 may include or utilize a liquid crystal display (LCD), touchscreen LCD (e.g., capacitive display), light emitting diode (LED) display, projector, or other display device to present information to a user of the apparatus 800 in a visual display.

One or more input devices 830 (e.g., an alphanumeric keyboard, microphone, keypad, remote controller, game controller, camera, or camera array) may be connected to the bus 814 via a user input port 822 to communicate information and commands to the apparatus 800. In selected embodiments, an input device 830 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 828, for example using a touch sensitive screen. A cursor control device may communicate direction information and command selections to the processor 802 and control cursor movement on the display 828. A cursor control device may have two or more degrees of freedom, for example allowing the device to specify cursor positions in a plane or three-dimensional space.

Example Embodiments

In some embodiments, a method comprising: receiving, by a computing device, a request for an instance of content; determining, by the computing device, contextual data for the instance of content; determining, by the computing device, a metric for concurrent playback sessions based on the contextual data, wherein the concurrent playback sessions are actively streaming content; and evaluating, by the computing device, the request to block or allow the request based on comparing the metric for concurrent playback sessions to a threshold for the concurrent playback sessions.

In some embodiments, the contextual data comprises entitlement information for the instance of content, wherein the entitlement information is associated with a restriction to access the instance of content; and the metric for concurrent playback sessions is determined based on the entitlement information.

In some embodiments, the contextual data comprises a content type.

In some embodiments, the content type is selected from a plurality of content types that describe different types of content.

In some embodiments, the content type comprises a live programming content type and a video on demand content type.

In some embodiments, the concurrent playback sessions comprise existing sessions at a time the request is received.

In some embodiments, the metric for the concurrent playback sessions comprises a number of concurrent playback sessions that are actively streaming content.

In some embodiments, the metric for the concurrent playback sessions are associated with characteristics that meet the contextual data In some embodiments, the threshold is determined by: selecting a global threshold that is applicable to concurrent playback sessions with any contextual data.

In some embodiments, the threshold is determined by: selecting a category threshold for a category that is based on the contextual data, wherein the category threshold is selected from a plurality of category thresholds from different categories.

In some embodiments, the category threshold is applicable to concurrent playback sessions that are associated with the contextual data.

In some embodiments, a first number of concurrent playback sessions are applicable to the category threshold, and a second number of concurrent playback sessions are not applicable to the category threshold.

In some embodiments, the threshold comprises: a first threshold based on a portion of a global threshold, wherein the global threshold that is applicable to concurrent playback sessions with any contextual data, and a second threshold for the category, wherein the second threshold is applicable to concurrent playback sessions that are associated with the contextual data.

In some embodiments, the method further comprising: sending a response to the request that indicates the request is allowed or blocked.

In some embodiments, threshold is set based on limiting load on a server that processing the request.

In some embodiments, a server processes the request if allowed and a content delivery network separate from the server delivers the content to a client device that requested the instance of content, and the threshold is set based on limiting load on services provided by the server that processes the request.

In some embodiments, a non-transitory computer-readable storage medium containing instructions, that when executed, control a computer system to be operable for: receiving a request for an instance of content; determining contextual data for the instance of content; determining a metric for concurrent playback sessions based on the contextual data, wherein the concurrent playback sessions are actively streaming content; and evaluating the request to block or allow the request based on comparing the metric for concurrent playback sessions to a threshold for the concurrent playback sessions.

In some embodiments, a method comprising: receiving, by a computing device, a configuration for thresholds for concurrent playback sessions; determining, by the computing device, a global threshold that is applicable to concurrent playback sessions with any contextual data from the configuration; determining, by the computing device, a category threshold is applicable to concurrent playback sessions that are associated with a category of contextual data from the configuration; and applying, by the computing device, the global threshold and the category threshold to a request for an instance of content that is associated with the contextual data using a first metric for concurrent playback sessions associated with the global threshold and a second metric for concurrent playback sessions for the category threshold.

In some embodiments, the category threshold for a category is based on a content type and entitlement information associated with the request, wherein the category threshold is selected from a plurality of category thresholds from different categories.

In some embodiments, the category threshold comprises: a first threshold based on a portion of the global threshold, and a second threshold for the category, wherein the second threshold is applicable to concurrent playback sessions that are associated with the category.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   receiving, by a computing device, a request for an instance of content;
   evaluating, by the computing device, the request to block or allow the request based on:
   comparing, by the computing device, a first metric for concurrent playback sessions to a first threshold for the concurrent playback sessions, wherein the first threshold and the first metric are applicable to concurrent playback sessions with any contextual data;
   when the first threshold is met, blocking, by the computing device, access to the instance of content for the request;
   when the first threshold is not met:
   determining, by the computing device, contextual data for the instance of content;
   comparing, by the computing device, a second metric for concurrent playback sessions to a second threshold for the concurrent playback sessions, wherein the second threshold and the second metric are applicable to concurrent playback sessions that are associated with contextual data for the request; and
   when the second threshold is met, blocking, by the computing device, access to the instance of content for the request.

2. The method of claim 1, wherein:
the contextual data comprises entitlement information for the instance of content, wherein the entitlement information is associated with a restriction to access the instance of content; and
the metric for concurrent playback sessions is determined based on the entitlement information.

3. The method of claim 1, wherein the contextual data comprises a content type.

4. The method of claim 3, wherein the content type is selected from a plurality of content types that describe different types of content.

5. The method of claim 3, wherein the content type comprises a live programming content type and a video on demand content type.

6. The method of claim 1, wherein the concurrent playback sessions comprise existing sessions at a time the request is received.

7. The method of claim 1, wherein the metric for the concurrent playback sessions comprises a number of concurrent playback sessions that are actively streaming content.

8. The method of claim 1, wherein the metric for the concurrent playback sessions are associated with characteristics that meet the contextual data.

9. The method of claim 1, wherein the first threshold comprises a global threshold that is applicable to concurrent playback sessions with any contextual data.

10. The method of claim 1, wherein the second threshold comprises a category threshold for a category that is based on the contextual data, wherein the category threshold is selected from a plurality of category thresholds from different categories.

11. The method of claim 10, wherein the category threshold is applicable to concurrent playback sessions that are associated with the contextual data.

12. The method of claim 10, wherein:
a first number of concurrent playback sessions are applicable to the category threshold, and
a second number of concurrent playback sessions are not applicable to the category threshold.

13. The method of claim 1, wherein:
the first threshold is based on a portion of a global threshold, wherein the global threshold that is applicable to concurrent playback sessions in multiple categories, and
the second threshold is for a category, wherein the second threshold is applicable to concurrent playback sessions that are associated with the category.

14. The method of claim 1, further comprising:
sending a response to the request that indicates the request is allowed or blocked.

15. The method of claim 1, wherein the first threshold and the second threshold are set based on limiting load on a server that processing the request.

16. The method of claim 1, wherein:
a server processes the request if allowed and a content delivery network separate from the server delivers the content to a client device that requested the instance of content, and
the threshold is set based on limiting load on services provided by the server that processes the request.

17. A non-transitory computer-readable storage medium containing instructions, that when executed, control a computer system to be operable for:
receiving a request for an instance of content;
evaluating the request to block or allow the request based on:
comparing a first metric for concurrent playback sessions to a first threshold for the concurrent playback sessions, wherein the first threshold and the first metric are applicable to concurrent playback sessions with any contextual data;
when the first threshold is met, blocking access to the instance of content for the request;
when the first threshold is not met:
determining contextual data for the instance of content;
comparing a second metric for concurrent playback sessions to a second threshold for the concurrent playback sessions, wherein the second threshold and the second metric are applicable to concurrent playback sessions that are associated with contextual data for the request; and
when the second threshold is met, blocking access to the instance of content for the request.

18. A method comprising:
receiving, by a computing device, a configuration for thresholds for concurrent playback sessions;
determining, by the computing device, a global threshold that is applicable to concurrent playback sessions with any contextual data from the configuration;
determining, by the computing device, a category threshold is applicable to concurrent playback sessions that are associated with a category of contextual data from the configuration;
applying, by the computing device, the global threshold to a request for an instance of content that is associated with the contextual data using a first metric for concurrent playback sessions associated with the global threshold;
when the global threshold is met, blocking, by the computing device, access to the instance of content for the request;
when the global threshold is not met:
applying, by the computing device, a category threshold to the request using a second metric for concurrent playback sessions for the category threshold; and
when the category threshold is met, blocking, by the computing device, access to the instance of content for the request.

19. The method of claim 18, wherein the category threshold for a category is based on a content type and entitlement information associated with the request, and wherein the category threshold is selected from a plurality of category thresholds from different categories.

20. The method of claim 18, wherein:
the global threshold based on a portion of an absolute global limit, and
the category threshold is applicable to concurrent playback sessions that are associated with the category.

* * * * *